Nov. 25, 1930.  G. F. ECKART  1,783,158
FLEXIBLE COUPLING
Filed July 5, 1929
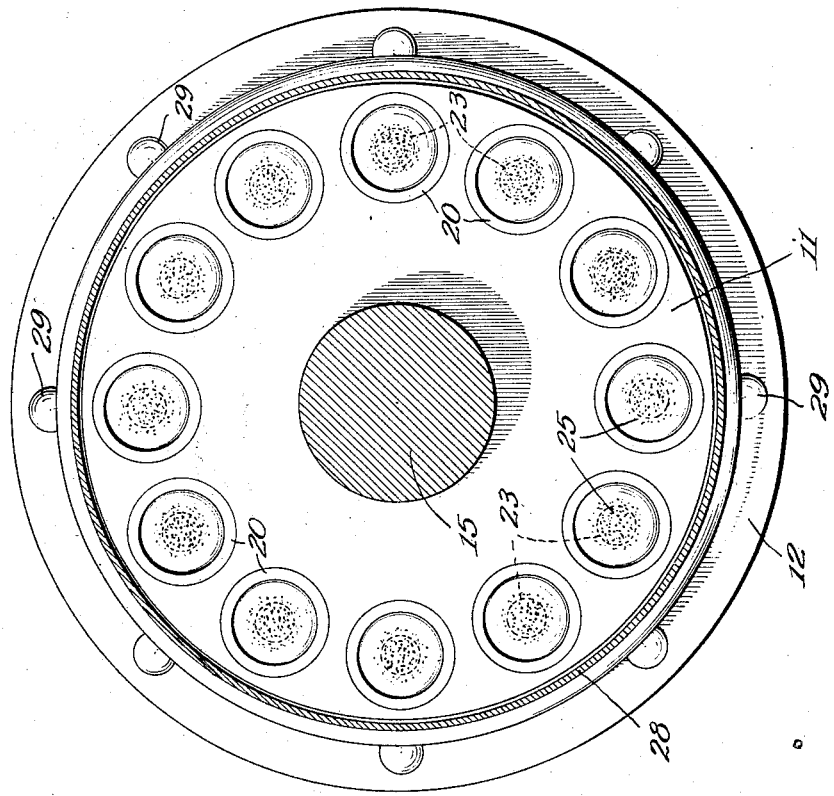
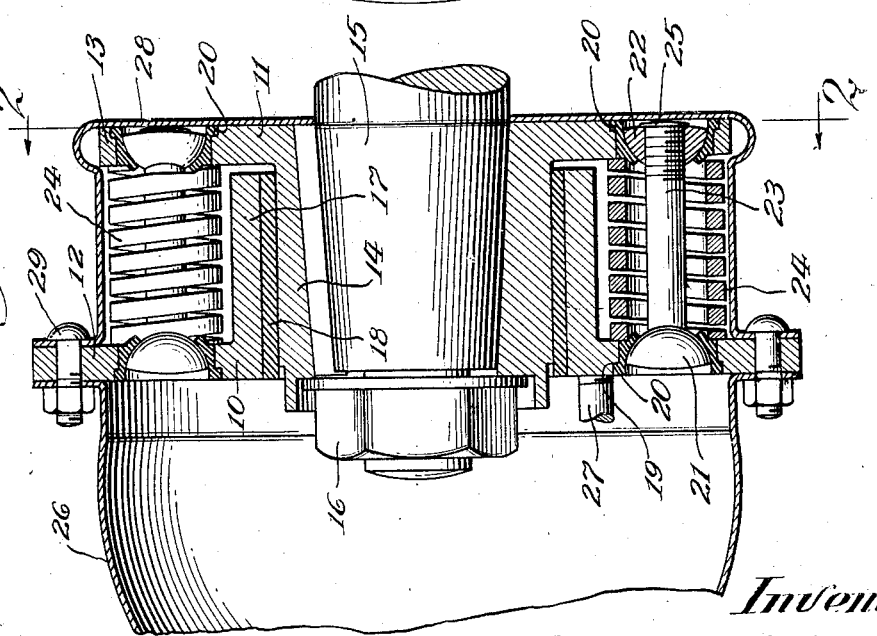
Inventor
George F. Eckart.
By Banning & Banning
Attorneys Patented Nov. 25, 1930

1,783,158

UNITED STATES PATENT OFFICE

GEORGE F. ECKART, OF CHICAGO, ILLINOIS, ASSIGNOR TO GEORGE A. CHRITTON, OF CHICAGO, ILLINOIS, TRUSTEE

FLEXIBLE COUPLING

Application filed July 5, 1929. Serial No. 376,012.

An object of this invention is to provide an improved and simplified form of flexible coupling which is particularly adapted to be used in the propeller shaft of an automobile, truck, or the like.

This and other objects, as will hereinafter appear, are accomplished by this invention which is fully described in the following specification, and shown in the accompanying drawing, in which—

Figure 1 is a longitudinal section through the flexible coupling; and

Fig. 2 is an elevation on the line 2—2 of Fig. 1.

The embodiment illustrated comprises driving and driven elements 10 and 11 which have flanges 12 and 13 respectively. The driven element 11 is provided with a hub 14 into which is fitted and keyed the tapered end 15 of the differential pinion shaft, and is secured thereon by means of a nut 16. The element 10 is provided with a central hub 17 which surrounds the hub 14, and is provided with a bushing 18 in which the hub 14 is journaled.

The flanges 12 and 13 are provided with shouldered openings 19 in which are fitted specially hardened steel bushings 20. These are made semi-spherical on the inside to fit the semi-spherical head 21 and nut 22 of the radius rods 23.

Around each of the radius rods is placed a helical compression spring 24 which is fitted at its ends having suitable shoulders on the bushings 20, as shown in Fig. 1.

In assembling the elements which have thus been described, the radius rods 23 are prevented from turning while the nuts 22 are screwed into place and adjusted, after which the end of the rod is electrically welded at 25 to the nut 22 so that it cannot thereafter readily become disassembled. The various springs 24 are made as uniform as possible so as to uniformly distribute the driving load about the axis of the shaft 15.

The driving element 10 is secured to the differential (not shown) which is contained within the housing 26 by any suitable means, such as studs 27 which are screwed into the driving element 10, and which pass through one of the members of the differential.

The flexible coupling is enclosed within a suitable casing 28 which has a central opening closely surrounding the shaft 15. Both the housing 26 and the casing 28 are flanged, and are secured to opposite sides of the flange 12 of the element 10 by means of suitable bolts 29.

Thus it will be seen that a very simple and efficient form of flexible coupling or "shockless drive" is obtained. In practice it is found that this coupling has many points of superiority over the drive heretofore used for this purpose. It has as much flexibility in one direction as in the other, and it lends itself readily to manufacture because of the simplicity of the parts, and the fact that no special tools or jigs are required either to make the parts or to assemble them.

The amount of motion permissible in either direction is limited by the space between the inner face of the flange 13 and the opposing end of the hub 17. These faces are made to approach each other as the elements 10 and 11 are angularly displayed in respect to each other due to the action of the radius rods 23. This same action distorts the springs 24, and this distortion becomes greater as the angular displacement increases, with the result that the springs naturally tend to return the elements to their normal position.

While I have described and shown but a single embodiment of my invention, it is to be understood that it is capable of many modifications. Changes, therefore, in the construction and arrangement may be made which do not depart from the spirit and scope of the invention as disclosed in the appended claims.

I claim:

1. A flexible coupling comprising a driving and a driven member having a common axis and each having an opposing flange, means for guiding one member with respect to the other means for flexibly connecting said flanges, and a series of helical springs having their axes disposed at intervals in a circle about the axis of said members, said springs lying between the members and tending to keep said members separated.

2. A flexible coupling comprising a driving and a driven member having a common axis and each having an opposing flange, radius rods for flexibly connecting said flanges, and a series of helical spirngs disposed at intervals about the axis of said members and tending to keep said members separated.

3. A flexible coupling comprising a driving and a driven member having a common axis and each having an opposing flange, a series of radius rods flexibly connecting said flanges and uniformly distributed about the axis of said flanges, and a series of compression springs, each spring being disposed between said flanges and about one of said rods, said springs resisting any effort to displace one flange angularly with respect to the other.

4. A flexible coupling comprising a driving and a driven member having a common axis and each having an opposing flange, a series of radius rods flexibly connecting said flanges and uniformly distributed about the axis of said flanges, a compression spring on each rod between said flanges, semispherical heads on the ends of said rods, and spherical cups to receive the same carried by said flanges, said cups having shoulders for guiding the ends of said springs.

5. A flexible coupling comprising a driving and a driven member having a common axis and each having an opposing flange, a series of radius rods flexibly connecting said flanges and uniformly distributed about the axis of said flanges, a compression spring on each rod between said flanges, semispherical heads on the ends of said rods, and spherical cups to receive the same carried by said flanges, said flanges carrying means for guiding the ends of said springs.

In testimony whereof, I have hereunto set my hand this 17th day of June, 1929.

GEORGE F. ECKART.